(12) United States Patent
Kanatake et al.

(10) Patent No.: US 9,412,406 B2
(45) Date of Patent: Aug. 9, 2016

(54) TRACKING CONTROL DEVICE, TRACKING CONTROL METHOD, AND OPTICAL DISC APPARATUS

(71) Applicant: MITSUBISHI ELECTRIC CORPORATION, Tokyo (JP)

(72) Inventors: Yusuke Kanatake, Tokyo (JP); Nobuo Takeshita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/771,166

(22) PCT Filed: Jul. 24, 2013

(86) PCT No.: PCT/JP2013/070019
§ 371 (c)(1),
(2) Date: Aug. 27, 2015

(87) PCT Pub. No.: WO2014/136285
PCT Pub. Date: Sep. 12, 2014

(65) Prior Publication Data
US 2016/0155461 A1   Jun. 2, 2016

(30) Foreign Application Priority Data
Mar. 7, 2013  (JP) .................. 2013-044824

(51) Int. Cl.
*G11B 7/00* (2006.01)
*G11B 20/18* (2006.01)
*G11B 7/09* (2006.01)

(52) U.S. Cl.
CPC ............ *G11B 7/0929* (2013.01); *G11B 7/0901* (2013.01)

(58) Field of Classification Search
CPC ........ G11B 27/36; G11B 33/08; G11B 19/04; G11B 7/08511; G11B 7/0901; G11B 7/09562; G11B 7/094; G11B 7/005; G11B 20/10009; G11B 7/0953
USPC .......... 369/44.25, 44.32, 47.17, 53.14, 53.18, 369/53.42
See application file for complete search history.

(56) References Cited

U.S. PATENT DOCUMENTS

| 5,285,431 A | 2/1994 | Ogawa | |
| 6,442,112 B1 * | 8/2002 | Tateishi | G11B 7/0901 369/44.32 |

(Continued)

FOREIGN PATENT DOCUMENTS

| JP | 63-184970 A | 7/1988 |
| JP | 64-4986 A | 1/1989 |

(Continued)

*Primary Examiner* — Nabil Hindi
(74) *Attorney, Agent, or Firm* — Birch, Stewart, Kolasch & Birch, LLP

(57) ABSTRACT

A tracking control device includes a signal detector that detects a tracking error signal, and a crossing direction, a crossing period and a crossing velocity of an objective lens from a detection signal of an optical detector, a tracking drive signal generator that generates a tracking drive signal on the basis of the tracking error signal, a velocity-reduction drive signal generator that generates a velocity reduction drive signal for converging the crossing velocity into a vicinity of zero on the basis of the crossing direction and the crossing period, a loop switch, and a system controller that causes to executes velocity reduction driving for driving the objective lens actuator on the basis of the velocity reduction drive signal and that controls each of the members so as to switch from the velocity reduction driving to driving for driving the objective lens actuator on the basis of the tracking drive signal.

7 Claims, 11 Drawing Sheets

(56) References Cited

U.S. PATENT DOCUMENTS 7,016,272 B2    3/2006    Enokihara
8,363,518 B2    1/2013    Hoshino et al.

FOREIGN PATENT DOCUMENTS

| | | |
|---|---|---|
| JP | 2-158920 A | 6/1990 |
| JP | 2-260131 A | 10/1990 |
| JP | 9-44860 A | 2/1997 |
| JP | 2000-20965 A | 1/2000 |
| JP | 2002-208154 A | 7/2002 |
| JP | 2003-196849 A | 7/2003 |
| JP | 2008-310837 A1 | 12/2008 |
| WO | WO 2007/040055 A1 | 4/2007 |
| WO | WO 2011/104756 A1 | 9/2011 |

* cited by examiner

TRACKING CONTROL DEVICE, TRACKING CONTROL METHOD, AND OPTICAL DISC APPARATUS

TECHNICAL FIELD

The present invention relates to a tracking control device and a tracking control method for performing tracking control in an optical disc apparatus, and relates to an optical disc apparatus including the tracking control device.

BACKGROUND ART

An optical disc apparatus capable of recording and/or reproducing information on/from an optical disc such as a BD (Blu-ray Disc), a DVD (Digital Versatile Disc) or a CD (Compact Disc) has been widely spread. In order to read information from the optical disc, focusing control and tracking control for causing an objective lens supported in an optical pickup to follow a face wobbling (wobbling of the optical disc in a focusing direction) and an eccentricity (wobbling of the optical disc in a tracking direction) generated during rotation of the optical disc are required. The face wobbling component and eccentricity component can be expressed as sine waves whose one period is the time required for one rotation of the optical disc and whose amplitudes are the face wobbling amount and the eccentricity amount respectively. In the following description, control of causing the objective lens to follow the eccentricity of the optical disc will be mainly explained.

Though the objective lens vibrates at its own natural vibration frequency in a tracking-off state in which no tracking control is performed, it is assumed here that the objective lens is at rest in a center position of an optical pickup supporting the objective lens. Under this assumption, the optical disc alone becomes eccentric during rotation of the optical disc and a track of the optical disc crosses the objective lens. However, it can be seemingly regarded that the objective lens moves in a tracking direction (that is, in a radial direction of the optical disc) to cross the track of the optical disc.

Usually, in an optical disc apparatus, after a period (track crossing period) $T_{CR}$ (sec), in which the objective lens crosses the track of the optical disc during rotation of the optical disc, has become larger than a predetermined period threshold value $T_{TH}$ (sec), tracking pull-in is executed. During rotation of the optical disk, a velocity $V_{CR}$ (m/sec) (track crossing velocity), at which the objective lens crosses the track of the optical disc, is proportional to the reciprocal of the track crossing period $T_{CR}$ (sec). Thus, the aforementioned control content is equivalent to that the tracking pull-in is executed after the track crossing velocity $V_{CR}$ (m/sec) has become smaller than a predetermined velocity threshold $V_{TH}$ (m/sec).

Letting a maximum value of an optical-disc eccentricity velocity $V_E(t)$ during rotation of the optical disc be $V_{EMAX}$ (m/sec), the maximum value $V_{EMAX}$ (m/sec) of the eccentricity velocity $V_E(t)$ is extremely larger than the velocity threshold $V_{TH}$ (m/sec) ($V_{TH} \ll V_{EMAX}$) in general. Here, the eccentricity velocity $V_E(t)$ is a relative movement velocity in the radial direction between the optical disc and the objective lens during rotation of the optical disc. Hence, a timing of execution of the tracking pull-in is a point of time at which the optical-disc eccentricity velocity $V_E(t)$ becomes substantially zero. This point of time is a time when an optical-disc eccentricity component Ecc(t) becomes a maximum or a minimum (that is, a time when the eccentricity amount which is the absolute value of the eccentricity component becomes a maximum). For example, if the tracking pull-in is executed at the time when the optical-disc eccentricity component Ecc(t) becomes a minimum, since the objective lens needs moving, with respect to the center position of the optical pickup, by an eccentricity amount from the minimum to the maximum of the optical-disc eccentricity component Ecc (i.e., Peak-to-Peak amount of the eccentricity amount), a lens offset amount of the objective lens after the tracking pull-in is large. If the eccentricity amount of the optical disc is large, the lens offset amount further increases. If the lens offset amount is too large, there is a risk that the tracking control causes the objective lens to move beyond an allowable movable range in the tracking direction, and there is another risk that not only it makes tracking control unstable but also causes damage to the objective lens.

Proposals for tracking control are described in Patent References 1 and 2, for example. Patent Reference 1 proposes a tracking control device which measures an eccentricity amount of the optical disc (a wobble width in the tracking direction of the optical disc) before tracking pull-in and outputs a drive signal for correcting the eccentricity amount on the basis of the measurement result. Patent Reference 2 proposes an optical disc apparatus which acquires a plurality of lens offset amounts from a tracking drive signal corresponding to one rotation of an optical disc and adjusts by using their representative value a sled position which is a position of an optical pickup in the optical-disc radial direction.

PRIOR ART REFERENCES

Patent References

Patent Reference 1: Japanese Patent Application Publication No. 2000-20965 (Paragraphs 0016 to 0029, FIG. 1)

Patent Reference 2: Japanese Patent Application Publication No. 2002-208154 (Abstract, Paragraph 0052, FIGS. 3 and 5)

SUMMARY OF THE INVENTION

Problems to be Solved by the Invention

As mentioned above, the conventional optical disc apparatuses have a problem that, if the lens offset amount of the objective lens after the tracking pull-in is too large, the objective lens may move beyond the allowable movable range in the tracking direction, and not only it may make tracking control unstable but also may cause damage to the objective lens.

In the tracking control device described in Patent Reference 1, because the lens offset amount of the objective lens after the tracking pull-in is not considered, the possibility that the objective lens moves beyond the allowable movable range in the tracking direction is not reduced.

In the optical disc apparatus described in Patent Reference 2, since the sled position is adjusted after the optical disc makes one rotation after the tracking pull-in, there is a possibility that the objective lens moves beyond the allowable movable range during the one rotation.

An object of the present invention is to provide a tracking control device and a tracking control method capable of suppressing a lens offset amount after tracking pull-in by switching a tracking drive signal and also to provide an optical disc apparatus which includes the tracking control device.

Means for Solving the Problem

A tracking control device according to one aspect of the invention has a signal detector that detects, from a detection signal of an optical detector that receives light reflected from a track of a rotating optical disc, a tracking error signal, and a crossing direction, a crossing period and a crossing velocity of an objective lens with respect to the track, a first drive signal generator that generates, on a basis of the tracking error signal detected by the signal detector, a first tracking drive signal for driving an objective lens actuator that moves the objective lens of an optical pickup in a tracking direction, a second drive signal generator that generates, on a basis of the crossing direction and the crossing period detected by the signal detector, a second tracking drive signal for converging the crossing velocity into a vicinity of zero, a drive signal switch that switches a drive signal supplied to the objective lens actuator, and a system controller that controls operation of the first drive signal generator, the second drive signal generator and the drive signal switch so as to cause to execute second driving for driving the objective lens actuator on a basis of the second tracking drive signal and switch from the second driving to first driving for driving the objective lens actuator on a basis of the first tracking drive signal, thereby causing to execute the first driving. The second drive signal generator is configured to generate the second tracking drive signal so as to prevent the objective lens from moving beyond a predetermined allowable movable range in the tracking direction during the second driving. The system controller causes the second drive signal generator to change a polarity of the second tracking drive signal when the crossing direction of the objective lens switches over in the second driving, and if number of changes in the polarity within a predetermined time is not less than a predetermined value, causes to terminate output of the second tracking drive signal, executes tracking pull-in, and thereby causes a shift to the second driving.

A tracking control method according to another aspect of the invention includes the steps of: detecting, from a detection signal of an optical detector that receives light reflected from a track of a rotating optical disc, a tracking error signal, and a crossing direction, a crossing period and a crossing velocity of an objective lens with respect to the track, generating a first tracking drive signal, on a basis of the detected tracking error signal, for driving an objective lens actuator that moves the objective lens of an optical pickup in a tracking direction, generating a second tracking drive signal, on a basis of the detected crossing direction and crossing period, for converging the crossing velocity into a vicinity of zero, and switching a drive signal supplied to the objective lens actuator so as to cause to execute second driving for driving the objective lens actuator on a basis of the second tracking drive signal and switch from the second driving to first driving for driving the objective lens actuator on a basis of the first tracking drive signal, thereby causing to execute the first driving. In the generating of the second tracking drive signal, the second tracking drive signal is generated so as to prevent the objective lens from moving beyond a predetermined allowable movable range in the tracking direction during the second driving. A polarity of the second tracking drive signal is changed when the crossing direction of the objective lens switches over in the second driving, and if number of changes in the polarity within a predetermined time is not less than a predetermined value, output of the second tracking drive signal is terminated, tracking pull-in is executed and thereby a shift to the second driving is caused.

An optical disc apparatus according to still another aspect of the invention has a spindle motor that rotates an optical disc, a laser light source that irradiates a track of the rotating optical disc with laser light, an objective lens that condenses the laser light and light reflected from the track, an objective lens actuator that moves the objective lens at least in a tracking direction, an optical detector that receives the light reflected from the track, a signal detector that detects, from a detection signal of the optical detector, a tracking error signal, and a crossing direction, a crossing period, and a crossing velocity of the objective lens with respect to the track, a signal detector that detects a tracking error signal, and a crossing direction, a crossing period and a crossing velocity of the objective lens with respect to the track which are calculated from the detection signal of the optical detector that receives the light reflected from the track of the rotating optical disc, a first drive signal generator that generates a first tracking drive signal for driving the objective lens actuator that moves the objective lens of an optical pickup in the tracking direction on a basis of the tracking error signal detected by the signal detector, a second drive signal generator that generates a second tracking drive signal for converging the crossing velocity into a vicinity of zero on a basis of the crossing direction and the crossing period detected by the signal detector, a drive signal switch that switches a drive signal supplied to the objective lens actuator, and a system controller that controls operation of the first drive signal generator, the second drive signal generator and the drive signal switch so as to cause to execute second driving for driving the objective lens actuator on a basis of the second tracking drive signal and switch from the second driving to first driving for driving the objective lens actuator on a basis of the first tracking drive signal, thereby causing to execute the first driving. The second drive signal generator is configured to generate the second tracking drive signal so as to prevent the objective lens from moving beyond a predetermined allowable movable range in the tracking direction during the second driving. The system controller causes the second drive signal generator to change a polarity of the second tracking drive signal when the crossing direction of the objective lens switches over in the second driving, and if number of changes in the polarity within a predetermined time is not less than a predetermined value, causes to terminate output of the second tracking drive signal, executes tracking pull-in, and thereby causes a shift to the second driving.

Effects of the Invention

According to the present invention, because a crossing velocity of the objective lens is converged into zero before tracking pull-in, a lens offset amount after the tracking pull-in can be suppressed and stable tracking control can be performed after the tracking pull-in.

MODE FOR CARRYING OUT THE INVENTION

<1> Embodiment 1
<1-1> Configuration of Embodiment 1

Figure 1:
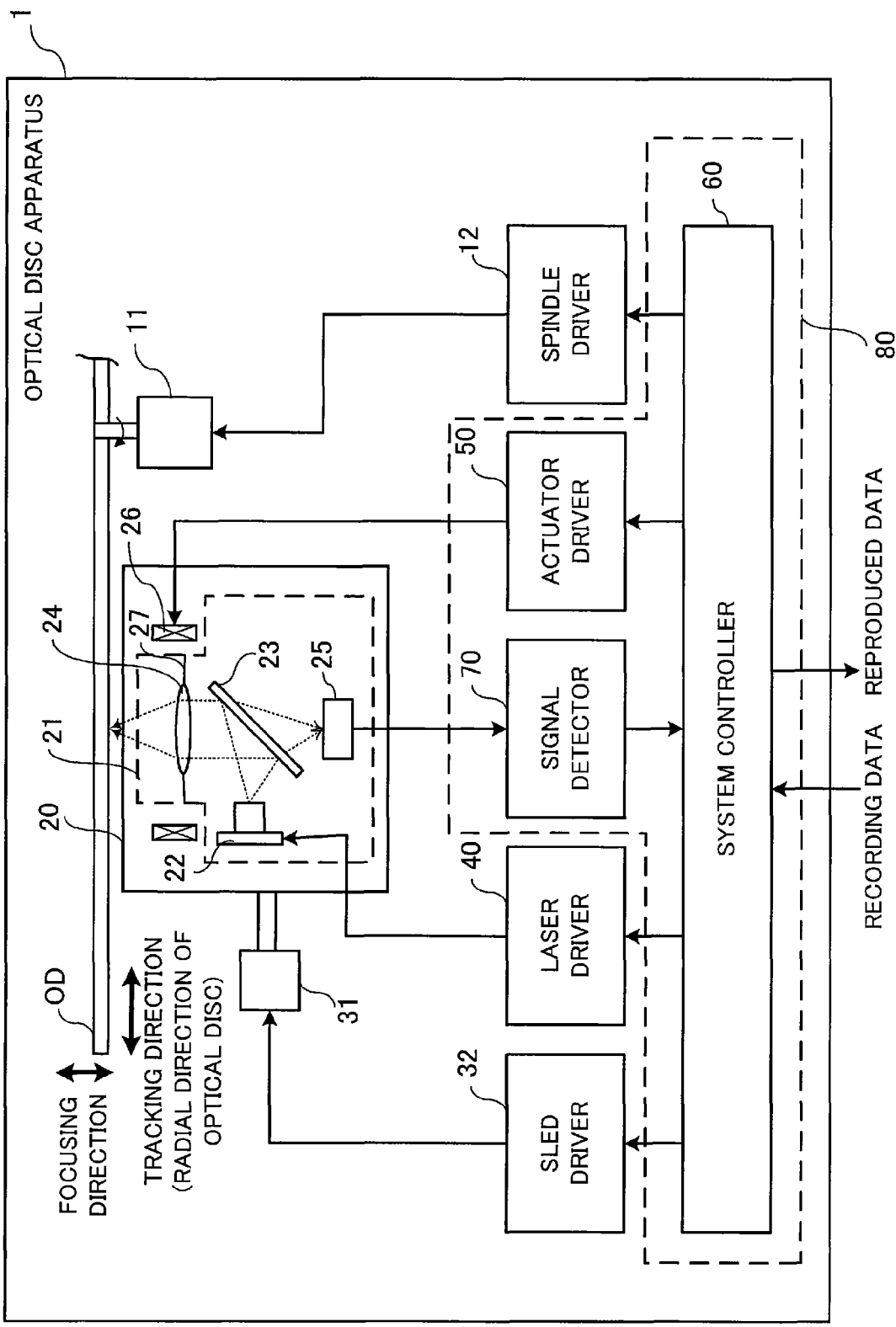
FIG. 1 is a block diagram schematically showing a configuration of an optical disc apparatus including a tracking control device according to embodiment 1 of the present invention.

FIG. 1 is a block diagram schematically showing a configuration of an optical disc apparatus 1 including a tracking control device 80 according to embodiment 1 of the present invention. As shown in FIG. 1, the optical disc apparatus 1 according to the embodiment 1 includes a spindle motor 11 for rotating an optical disc OD, a spindle driver 12 for driving the spindle motor 11, an optical pickup 20, a sled motor 31 for moving the optical pickup 20 in the radial direction of the optical disc OD, and a sled driver 32 for driving the sled motor 31. As rotation modes of the spindle motor 11, there are CAV (Constant Angular Velocity) mode where angular velocity is constant, CLV (Constant Linear Velocity) mode where linear velocity is constant, and the like. The optical disc OD includes a read-only disc from which only reproduction can be performed, a recordable disc from/to which reproduction/additional recording can be performed and to which rewriting cannot be performed, and a rewritable disc from which reproduction can be performed and to which additional recording and rewriting can be performed. The optical disc OD is, for example, a BD, a DVD, a CD or the like.

As shown in FIG. 1, the optical pickup 20 includes a laser light source 22, a beam splitter 23 for reflecting laser light from the laser light source 22, an objective lens 24 for focusing laser light reflected by the beam splitter 23 on an information recording surface of the optical disc OD, an optical detector 25 including a light receiving element for receiving reflected light reflected by the optical disc OD and transmitted through the objective lens 24 and the beam splitter 23 and for converting the received light to an electric signal, a lens unit 21 for accommodating these elements 22 to 25, an elastic support member 27 for supporting the objective lens 24 movably in the lens unit 21, and an objective lens actuator 26 for moving the objective lens 24 against the elastic force of the elastic support member 27 in a tracking direction and a focusing direction. The objective lens 24 condenses laser light onto the information recording surface of the optical disc OD. In the following description, a case where the objective lens 24 is moved in the tracking direction will be explained.

As shown in FIG. 1, the optical disc apparatus 1 includes a laser driver 40 for driving the laser light source 22, an actuator driver 50 for driving the objective lens actuator 26, a signal detector 70 for calculating and generating a tracking error signal TE and the like on the basis of a signal received from the optical detector 25, and a system controller 60 for controlling operation of the entire optical disc apparatus 1. The actuator driver 50, the signal detector 70 and the system controller 60 form the tracking control device 80 according to the embodiment 1 of the present invention (that is, a device capable of carrying out a tracking control method according to the embodiment 1 of the present invention). The tracking control device 80 performs feedback control for causing the position of the objective lens 24 to follow an optical-disc eccentricity component Ecc. The system controller 60 performs control over the entire optical disc apparatus 1 in order to output reproduced data based on information recorded on the optical disc OD or to record information based on input recording data onto the optical disc OD. In addition, the example of FIG. 1 is merely an example of an optical disc apparatus to which the present invention can be applied, and the configuration of the optical disc apparatus 1 is not limited to the example of FIG. 1.

Figure 2:
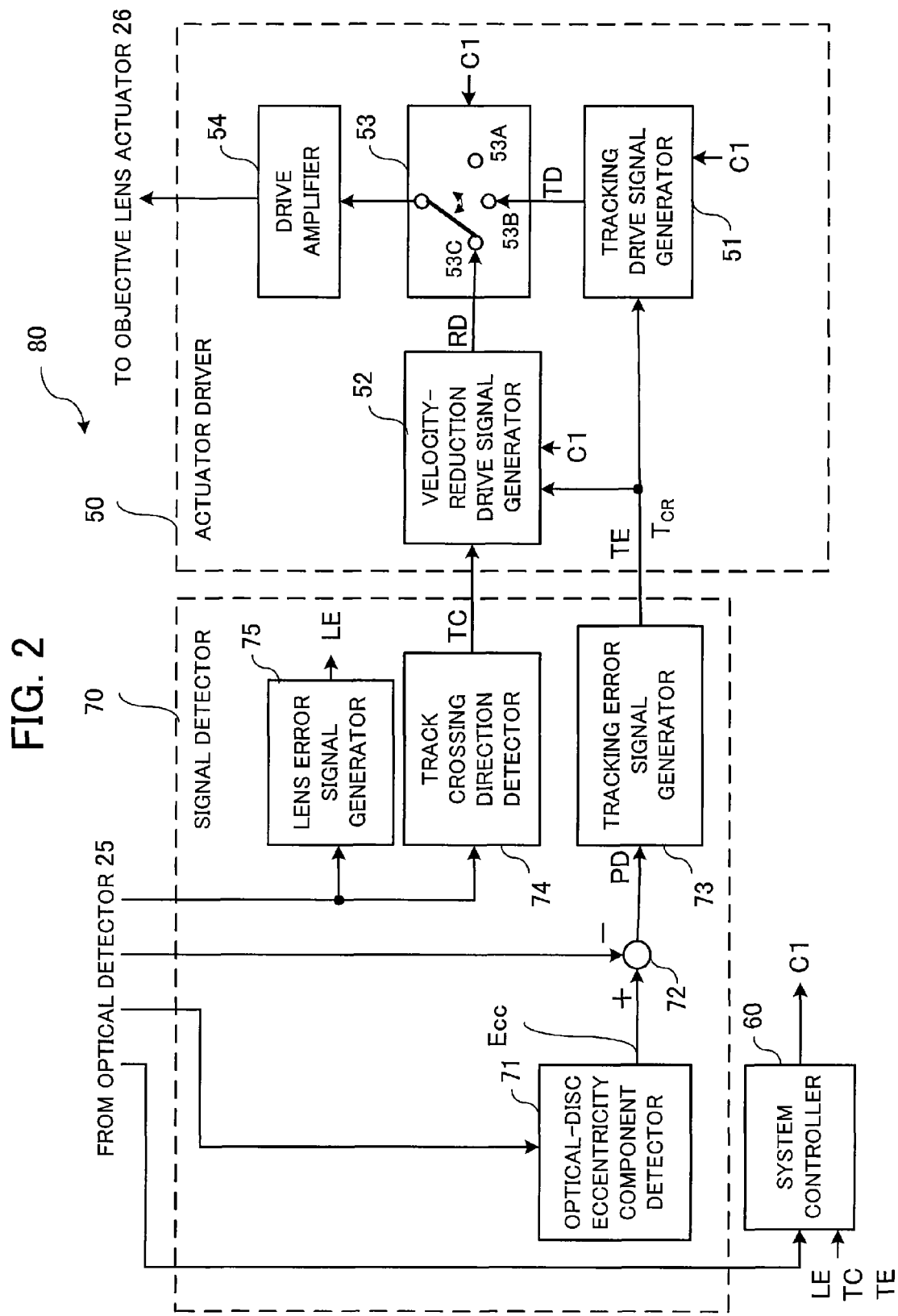
FIG. 2 is a block diagram schematically showing a configuration of the tracking control device according to the embodiment 1 (that is, a device capable of carrying out a tracking control method according to the embodiment 1).

FIG. 2 is a block diagram schematically showing a configuration of the tracking control device 80 according to the embodiment 1 (that is, the device capable of carrying out the tracking control method according to the embodiment 1). As shown in FIG. 2, the tracking control device 80 according to the embodiment 1 includes the signal detector 70, the system controller 60, and the actuator driver 50. The signal detector 70 includes an optical-disc eccentricity component detector 71, a subtractor 72, a tracking error signal generator 73, a track crossing direction detector 74, and a lens error signal generator 75. The actuator driver 50 includes a tracking drive signal generator (first tracking drive signal generator) 51, a velocity reduction drive signal generator (second tracking drive signal generator) 52, a loop switch 53, and a drive amplifier 54.

The optical-disc eccentricity component detector 71 detects or calculates an optical-disc eccentricity component signal indicative of an eccentricity component $Ecc(t)$ of the optical disc OD on the basis of a signal from the optical detector 25. The subtractor 72 subtracts a signal indicative of the position of the objective lens 24 from the optical-disc eccentricity component $Ecc(t)$, thereby generating a position deviation signal PD. The tracking error signal generator 73 generates a tracking error signal TE on the basis of the position deviation signal PD. The lens error signal generator 75 generates a lens error signal LE that is a signal indicative of the position of the objective lens 24 with respect to a predetermined neutral position as a reference position, on the basis of the signal from the optical detector 25.

The track crossing direction detector 74 generates a track crossing direction signal TC that expresses a track crossing direction indicative of a relative movement direction of the objective lens 24 to an eccentricity of the optical disc OD by a binary signal of "0" and "1". Since the relative movement direction of the objective lens 24 is determined by a sign of the track crossing velocity $V_{CR}$, the track crossing direction signal TC generated by the track crossing direction detector 74 may be determined depending on the sign of the track crossing velocity $V_{CR}$. However, base information for the track crossing direction signal TC generated by the track crossing direction detector 74 is not restricted to the sign of the track crossing velocity $V_{CR}$. The velocity reduction drive signal generator 52 determines a sign of a velocity reduction drive signal RD generated depending on a value of the track crossing direction signal TC. For example, if the track crossing direction signal TC is "0", the velocity reduction drive signal generator 52 makes the sign of the velocity reduction drive signal RD positive; if the track crossing direction signal TC is "1", the velocity reduction drive signal generator 52 makes the sign of the velocity reduction drive signal RD negative.

The tracking error signal generator 73 receives the position deviation signal PD obtained by subtracting the position of the objective lens 24 from the optical-disc eccentricity component Ecc(t). On the basis of the received position deviation signal PD, the tracking error signal generator 73 generates a tracking error signal TE which is detected when the objective lens 24 in the optical pickup 20 crosses a track on the optical disc OD. As a method of generating the tracking error signal TE by the tracking error signal generator 73, a publicly-known method such as a push-pull method, a DPP (Differential Push-Pull) method, and a DPD (Differential Phase Detection) method can be used. Moreover, the tracking error signal generator 73 also has a function of measuring a track crossing period $T_{CR}$. The track crossing period $T_{CR}$ can be acquired, for example, by measuring the period of a track zero cross signal obtained by binarizing the tracking error signal. However, the method of acquiring the track crossing period $T_{CR}$ is not limited to the aforementioned method, and another method may be employed.

The lens error signal generator 75 generates the lens error signal LE that is a signal indicative of the position of the objective lens 24 with respect to the neutral position.

The tracking drive signal generator 51 controls the position of the objective lens 24 in the tracking direction so as to make a position deviation closer to zero on the basis of the tracking error signal TE generated by the tracking error signal generator 73.

In order to reduce the track crossing velocity $V_{CR}$, the velocity-reduction drive signal generator 52 outputs the velocity reduction drive signal RD before tracking pull-in and controls the position of the objective lens 24 in the tracking direction. In addition, as the velocity reduction drive signal RD, for example, a pulse signal capable of having a positive or negative value, a sine wave signal capable of having a positive or negative value, or the like may be used. There is no special limitation on the velocity reduction drive signal RD, so long as it is a signal capable of having a positive or negative value with respect to a central value and a signal that enables the objective lens actuator 26 to operate after amplification by the drive amplifier 54, and signals having various waveforms can be used as the velocity reduction drive signal RD. A voltage value of the velocity reduction drive signal RD is defined by a maximum value of a voltage component. As the velocity reduction drive signal RD, for example, a sine wave expressed as $y=A\cdot\sin(\omega t)$ may be used, where t denotes time, $\omega$ denotes angular frequency, and A denotes amplitude. The amplitude A is also a voltage value of the velocity reduction drive signal RD.

The loop switch 53 is a drive signal switch for switching the tracking drive signal TD which is supplied to the drive amplifier 54 to any of a signal of an amplitude value "zero" (contact point 53A), the velocity reduction drive signal RD (contact point 53C), and the drive signal TD (contact point 53B) which is generated by the tracking drive signal generator 51. The loop switch 53 selects the contact point 53A when it supplies the signal of the amplitude value "zero" to the drive amplifier 54, or the loop switch 53 selects the contact point 53B when it supplies the output signal from the tracking drive signal generator 51 to the drive amplifier 54, or the loop switch 53 selects the contact point 53C when it supplies the output signal from the velocity-reduction drive signal generator 52 to the drive amplifier 54.

Here, the timing of switching the loop switch 53 will be described in detail. In a tracking-off state where no tracking control is performed, the loop switch 53 selects the contact point 53A. In this case, a signal input to the objective lens 24 is zero and the position of the objective lens 24 in the tracking direction is not controlled.

After it is switched from the tracking-off state to a tracking-on state, before tracking pull-in is executed, the loop switch 53 selects the contact point 53C and supplies the velocity reduction drive signal RD to the drive amplifier 54. In this case, on the basis of the velocity reduction drive signal RD output from the velocity-reduction drive signal generator 52, the objective lens actuator 26 is driven and the position of the objective lens 24 in the tracking direction is controlled. At the timing of executing the tracking pull-in, the loop switch 53 selects the contact point 53B and supplies the drive signal generated by the tracking drive signal generator 51 to the drive amplifier 54. In this case, on the basis of the drive signal generated by the tracking drive signal generator 51, the objective lens actuator 26 is driven and the position of the objective lens 24 in the tracking direction is controlled. The velocity-reduction drive signal generator 52 is configured to generate the velocity reduction drive signal (second tracking drive signal) RD so that the objective lens 24 is prevented from moving beyond a predetermined allowable movable range in the tracking direction during velocity reduction driving (second driving). The velocity-reduction drive signal generator 52 controls the value of the velocity reduction drive signal RD, e.g., voltage, so that the objective lens 24 is prevented from moving beyond the predetermined allowable movable range in the tracking direction during the velocity reduction driving.

The drive amplifier 54 amplifies a voltage value of a signal received through the loop switch 53. The drive amplifier 54 increases a dynamic range by amplifying the voltage values of the signals received from the tracking drive signal generator 51 and the velocity-reduction drive signal generator 52. In addition, the configuration of the tracking control device 80 according to the embodiment 1 is not limited to the configuration of FIG. 1.

<1-2> Operation of Comparative Example

FIGS. 3(a) to 3(e) are diagrams showing an example of signal waveforms in a case where the tracking pull-in is executed by using the technique in the comparative example (Patent Reference 1), and show the optical-disc eccentricity component Ecc(t) (FIG. 3(a)), the tracking error signal TE (FIG. 3(b)), the lens error signal LE (FIG. 3(c)), the tracking drive signal TD (FIG. 3(d)), and a state of the loop switch 53 (FIG. 3(e)). The tracking drive signal TD is a signal corresponding to a signal to be input to the drive amplifier 54 in FIG. 2. On the basis of the tracking drive signal TD, the objective lens actuator 26 is driven and the position of the objective lens 24 in the tracking direction is controlled. In the comparative example shown in FIGS. 3(a) to 3(e), the loop switch 53 is switched from a state where the contact point 53A is selected to a state where the contact point 53B is selected. In other words, in the comparative example shown in FIGS. 3(a) to 3(e), the contact point 53C of the loop switch 53 is not selected, the tracking pull-in is executed in the tracking-off state, and then the position of the objective lens 24 in the tracking direction is controlled depending on the tracking drive signal TD generated on the basis of the tracking error signal TE.

Letting an optical-disc eccentricity amount be ±H (m), the optical-disc eccentricity component Ecc(t) is expressed by the following expression (1).

$$\mathrm{Ecc}(t) = H \cdot \sin(2\pi f t) \quad \text{Expression (1)}$$

where f denotes a rotational frequency of the optical disc OD and t denotes time (sec).

An optical-disc eccentricity velocity $V_E(t)$ is obtained by differentiating the both sides of the expression (1) and is expressed by the following expression (2).

$$V_E(t) = d(\mathrm{Ecc})/dt = 2\pi f H \cdot \cos(2\pi f t) \quad \text{Expression (2)}$$

The tracking pull-in is usually executed at the timing when the track crossing velocity $V_{CR}$ of the objective lens 24 becomes a vicinity of zero. In the tracking-off state, the objective lens 24 vibrates at its own natural vibration frequency, but it is assumed here that the objective lens 24 is at rest in the center position of the optical pickup 20. In this case, the track crossing velocity $V_{CR}$ of the objective lens 24 has a sign that is an inverted sign of the optical-disc eccentricity velocity $V_E(t)$ expressed by the expression (2). Therefore, executing tracking pull-in at the timing when the track crossing velocity $V_{CR}$ of the objective lens 24 becomes a vicinity of zero is equivalent to executing tracking pull-in at the timing when the optical-disc eccentricity velocity $V_E(t)$ becomes a vicinity of zero. Time t when the right side of the expression (2) becomes zero is a time when the following expression is established.

$$t = 1/f \cdot (\frac{1}{4} + n/2) \ (n \text{ is an integer})$$

Substituting this into the expression (1) results in the following expression (3).

$$\mathrm{Ecc}(t) = \pm H \quad \text{Expression (3)}$$

Figure 3:
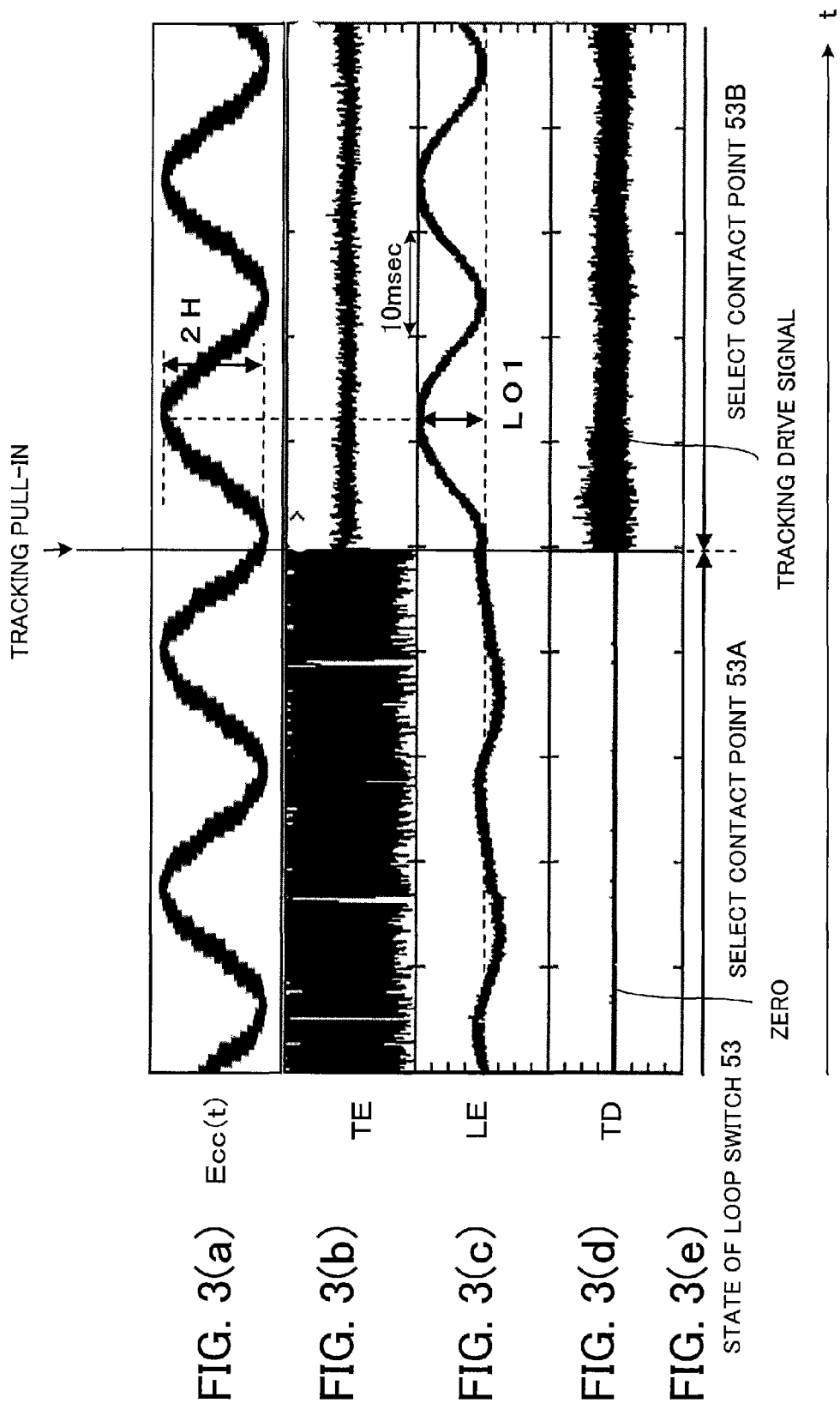
FIGS. 3(a) to 3(e) are diagrams showing an example of signal waveforms in a case where tracking pull-in is executed by using a technique of a comparative example (Patent Reference 1).

That is, the tracking pull-in is executed at the timing when the optical-disc eccentricity component Ecc(t) becomes a maximum. For example, let us suppose that the tracking pull-in is executed at the timing of Ecc(t)=−H. After the tracking pull-in, since the objective lens 24 is made to follow the eccentricity of the optical disc OD, it is necessary to move the objective lens 24 from Ecc(t)=−H to Ecc(t)=+H. Before the tracking pull-in, since the objective lens 24 is at the neutral position of the optical pickup 20, a movement amount of the objective lens 24 reaches approximately 2H (m) at the maximum in a time that is a half of the rotation period of the optical disc OD after the tracking pull-in is started. As shown in FIG. 3, a maximum voltage LO1 (V) of the lens error signal LE is expressed by the following expression (4), where lens error detection sensitivity is LK (V/m).

$$LO1 \approx 2H \cdot LK \quad \text{Expression (4)}$$

Since the value of H is large in a case where the optical disc eccentricity amount is large, there is a possibility that the value of 2H may exceed the allowable movable range of the objective lens 24 in the tracking direction in the comparative example.

<1-3> Operation of Embodiment 1

FIGS. 4(a) to 4(e) are diagrams showing an example of signal waveforms in a case where the tracking pull-in is executed in the tracking control device 80 according to the embodiment 1, and indicate the optical-disc eccentricity component Ecc(t) (FIG. 4(a)), the tracking error signal TE (FIG. 4(b)), the lens error signal LE (FIG. 4(c)), the tracking drive signal TD (FIG. 4(d)), and a state of the loop switch 53 (FIG. 4(e)). In the case of FIGS. 4(a) to 4(e), the loop switch 53 is switched from the state of the contact point 53A via the state of the contact point 53C to the state of the contact point 53B. That is, it is switched from the tracking-off state to the state where the velocity reduction drive signal RD is output (second driving), and then the tracking pull-in is executed and tracking control based on the tracking error signal TE (first driving) is performed.

In a case where the velocity reduction drive signal RD is output after the loop switch 53 is switched to the state where the contact point 53C is selected, the objective lens 24 catches up with the eccentricity of the optical disc OD shown in FIG. 4(a) as time passes, as shown by the lens error signal LE in FIG. 4(c). In the case of FIGS. 4(a) to 4(e), from the start of output of the velocity reduction drive signal RD (time t0) until approximately 10 (msec) (time t1), the sign of the velocity reduction drive signal RD is almost always positive. This indicates a state where the objective lens 24 does not catch up with the optical disc eccentricity velocity $V_E(t)$. Meanwhile, after a lapse of about 20 (msec) from the start of the output (t0) (after time t2), the number of changes in the sign of the velocity reduction drive signal RD increases. This indicates a state where the objective lens 24 catches up with the optical-disc eccentricity velocity $V_E(t)$ and the track crossing velocity $V_{CR}$ varies around zero. As shown in FIG. 4(d), it is desirable to execute the tracking pull-in in a state where the sign of the velocity reduction drive signal RD changes many times. Thus the tracking pull-in is executed when the objective lens 24 catches up with the eccentricity of the optical disc OD and when the track crossing velocity $V_{CR}$ is a vicinity of zero. As shown in FIG. 4(d), the operation of causing the objective lens 24 to catch up with the eccentricity of the optical disc OD by outputting the velocity reduction drive signal RD (a state where the contact point 53C is selected), is different from the operation of causing it to follow the eccentricity by means of the tracking pull-in (a state where the contact point 53B is selected). Here, "a vicinity of zero" or "zero" is a value where the velocity-reduction drive signal generator 52 detects that the track crossing velocity $V_{CR}$ is zero, and means a range which can be regarded as approximately zero.

In the case described above, a movement amount of the objective lens 24 after the tracking pull-in is about H (m). As shown in FIG. 4(c), a maximum voltage LO2 (V) of the lens error signal LE can be expressed by the following expression (5), where lens error detection sensitivity is LK (V/m).

$$LO2 \approx H \cdot LK \quad \text{Expression (5)}$$

As it can be understood from a comparison between the expressions (4) and (5), the lens offset amount LO2 after the tracking pull-in in a case where the tracking pull-in is executed in the embodiment 1, is about ½ of the lens offset amount LO1 after the tracking pull-in in a case where the tracking pull-in is executed by using the technique disclosed in the Patent Reference 1. Thus tracking control after the tracking pull-in is stabilized.

In the case of FIG. 4(d), a positive or negative pulse is output as the velocity reduction drive signal RD. FIGS. 5(a) and 5(b) show a position of the objective lens 24 (FIG. 5(b)) in a case where a pulse (FIG. 5(a)) is applied to the objective lens actuator 26. In FIGS. 5(a) and 5(b), the tracking drive signal TD (FIG. 5(a)) and the position of the objective lens 24 in the tracking direction (FIG. 5(b)) are shown. Because the objective lens 24 is supported by the elastic support member 27 such as a spring in relation to the optical pickup 20, if a pulse is applied to the objective lens actuator 26, the objective lens 24 moves due to force against the elastic force of the elastic support member 27. The period is a reciprocal ($T_{FO}$ (sec)) of the natural vibration frequency of the objective lens actuator 26 that controls driving of the objective lens 24. It is necessary to set the voltage value of the velocity reduction drive signal RD so that the position of the objective lens 24 is not beyond the allowable movable range in the tracking direction when a drive signal based on the velocity reduction drive signal RD is applied to the objective lens actuator 26.

Figure 5:
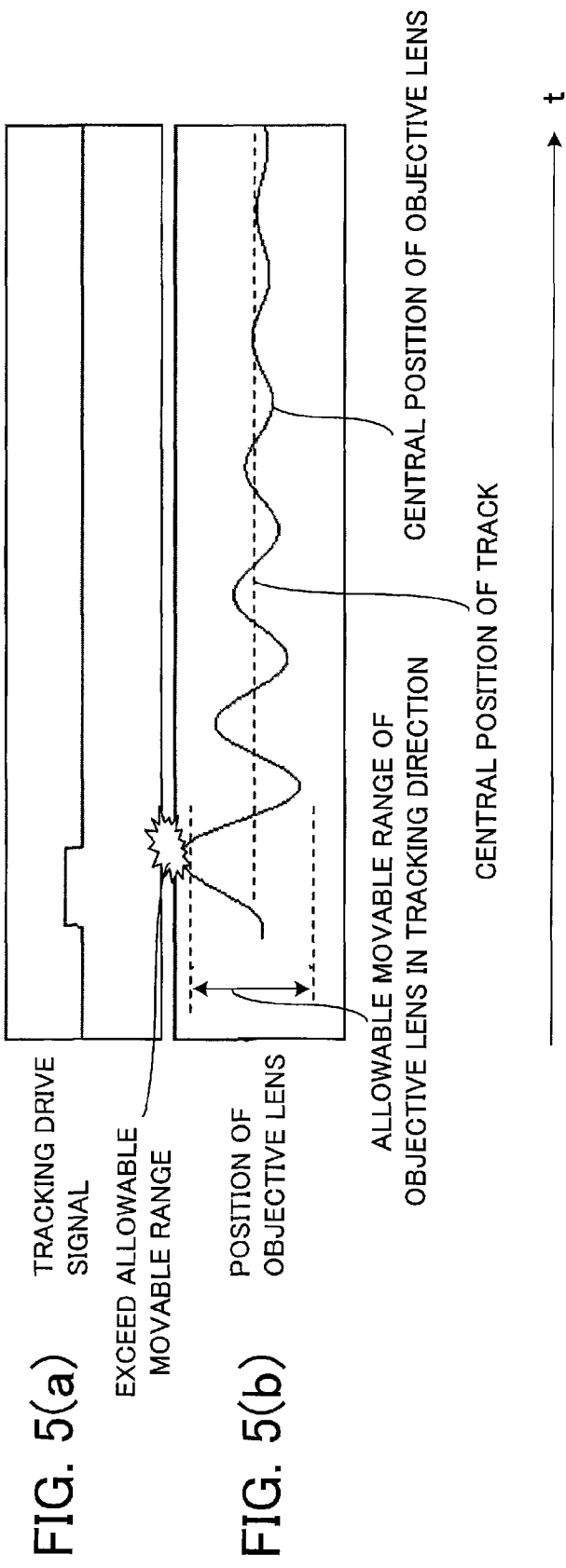
FIGS. 5(a) and 5(b) are explanatory diagrams showing a position of an objective lens in a case where a pulse is applied to an objective lens driving coil.

In the case of FIGS. 5(*a*) and 5(*b*), a case where after a time $T_{FO}/4$ (sec) elapses from application of the pulse, the objective lens 24 moves beyond the allowable movable range in the tracking direction is shown. In general, the natural vibration frequency of the objective lens actuator 26 is approximately 60 Hz, though it varies depending on the optical pickup 20. In this case, since $T_{FO} \approx 1/60 \approx 0.017$ (sec), $T_{FO}/4 \approx 0.004$ (sec) is obtained.

Figure 4:
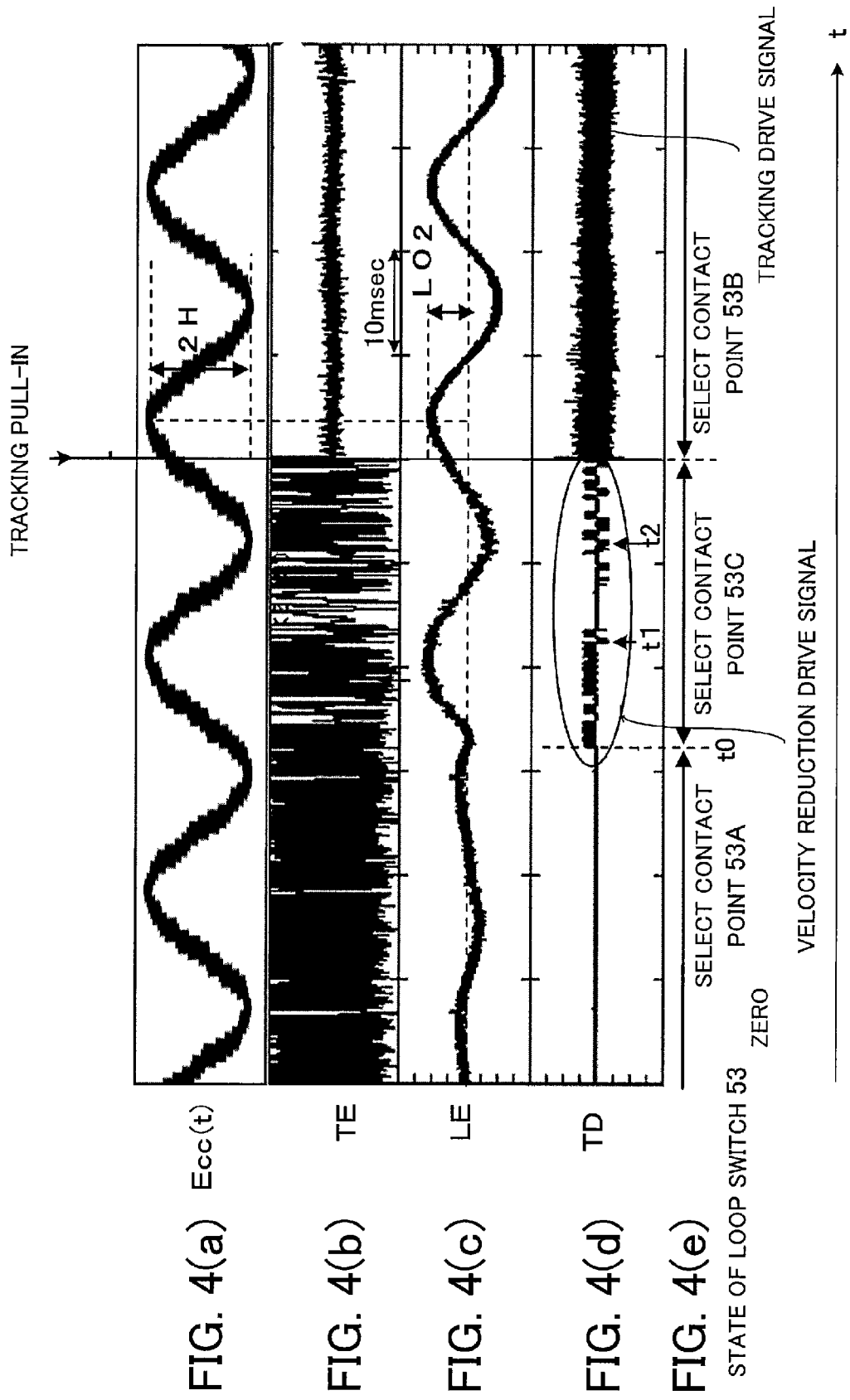
FIGS. 4(a) to 4(e) are diagrams showing an example of signal waveforms in a case where the tracking pull-in is executed in the tracking control device according to the embodiment 1.

On the other hand, in the case of FIGS. 4(*a*) to 4(*e*), a period of time (Tc (sec)) for which the velocity reduction drive signal RD is output, is slightly less than 0.03 (sec). From this fact, the relationship of the following expression (6) is established between Tc and $T_{FO}/4$.

$$Tc > T_{FO}/4 \qquad \text{Expression (6)}$$

If the relationship of the expression (6) is established, it is necessary to set the voltage of the velocity reduction drive signal RD so that the objective lens 24 does not move beyond the allowable movable range in the tracking direction during output of the velocity reduction drive signal RD. Here, it is desirable that the voltage of the velocity reduction drive signal RD is larger, since the larger the voltage of the velocity reduction drive signal RD is, the much time until the track crossing velocity $V_{CR}$ reaches zero is reduced. The voltage value may be large as long as it is within a range where the objective lens 24 does not exceed the allowable movable range in the tracking direction.

Figure 6:
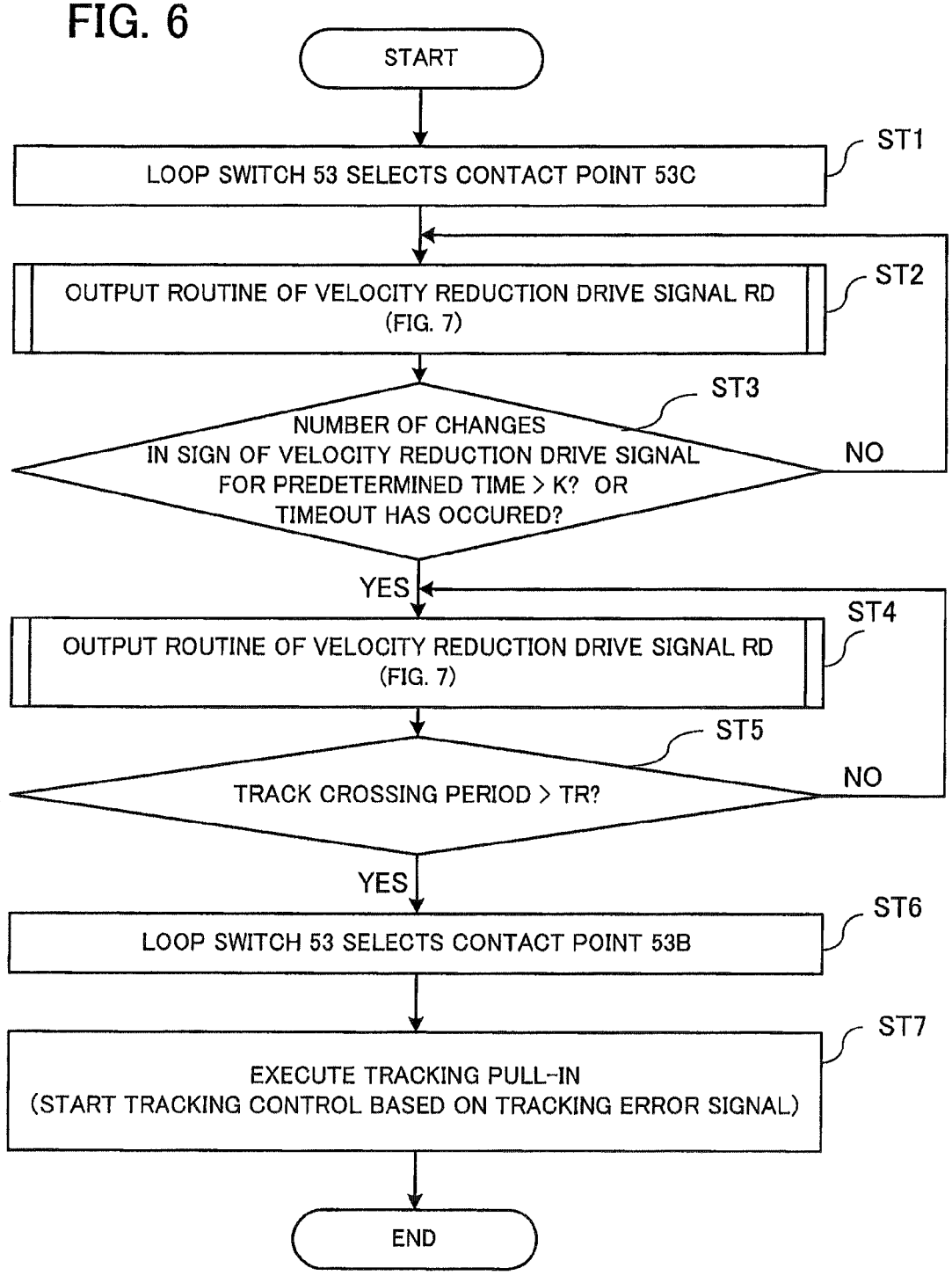
FIG. 6 is a flowchart showing an example of operation of the tracking control device according to the embodiment 1 (that is, the tracking control method according to the embodiment 1).

FIG. 6 is a flowchart showing an example of operation of the tracking control device 80 according to the embodiment 1 (that is, a tracking control method according to the embodiment 1). As shown in FIG. 6, in the tracking control device 80 according to the embodiment 1, when the tracking control is started, the loop switch 53 is switched from the state where the contact point 53A is selected and a signal with an amplitude value of "zero" is supplied to the drive amplifier 54 to the state where the contact point 53C is selected and the velocity reduction drive signal RD is supplied to the drive amplifier 54 (step ST1). That is, the actuator driver 50 of the tracking control device 80 switches the state of the loop switch 53 and shifts from a tracking-off state to a drive signal control state based on the velocity reduction drive signal RD where the velocity reduction drive signal RD amplified by the drive amplifier 54 can be output.

Next, the velocity-reduction drive signal generator 52 outputs the velocity reduction drive signal RD, and the drive amplifier 54 supplies the amplified velocity reduction drive signal RD to the objective lens actuator 26 (step ST2). Details of output processing of the velocity reduction drive signal RD will be explained later by using a flowchart of FIG. 7.

Next, the system controller 60 determines whether the number of changes in the sign of the velocity reduction drive signal RD within a predetermined time exceeds a predetermined value K or whether a predetermined timeout period has elapsed and then a timeout has occurred (step ST3). When the number of changes in the sign of the velocity reduction drive signal RD is more than the predetermined value, the objective lens 24 catches up with the optical-disc eccentricity velocity $V_E(t)$ and the track crossing velocity $V_{CR}$ varies around zero. It is desirable that the tracking pull-in be executed in this state. On the other hand, if the number of changes in the sign of the velocity reduction drive signal RD does not exceed the predetermined value even after the predetermined time elapses, it is regarded as a timeout and the process proceeds to the next processing. If the detetinination result of the step ST3 is "YES", the process proceeds to the next step; if the determination result of the step ST3 is "NO", the process returns to the step ST2.

If the determination result of the step ST3 is "YES", the velocity reduction drive signal RD is output again (step ST4). That is, in the next step ST4, even during a waiting time until the track crossing period $T_{CR}$ exceeds a predetermined value TR, the objective lens 24 moves while following the eccentricity of the optical disc OD. Thus a lens shift amount after the tracking pull-in can be suppressed.

Next, the tracking error signal generator 73 measures the track crossing period $T_{CR}$ and determines whether or not the track crossing period $T_{CR}$ has exceeded the predetermined value TR (step ST5). If the result of the determination in the step ST5 is "YES", the process proceeds to the next step ST6; if the result of the determination in the step ST5 is "NO", the process returns to the step ST4.

The system controller 60 switches the loop switch 53 from the state where the contact point 53C is selected to the state where the contact point 53B is selected (step ST6). That is, by executing the tracking pull-in after the output state of the velocity reduction drive signal RD, the tracking pull-in is started (step ST7).

If the tracking pull-in in the step ST7 is executed, tracking control based on the tracking error signal TE is carried out.

Figure 7:
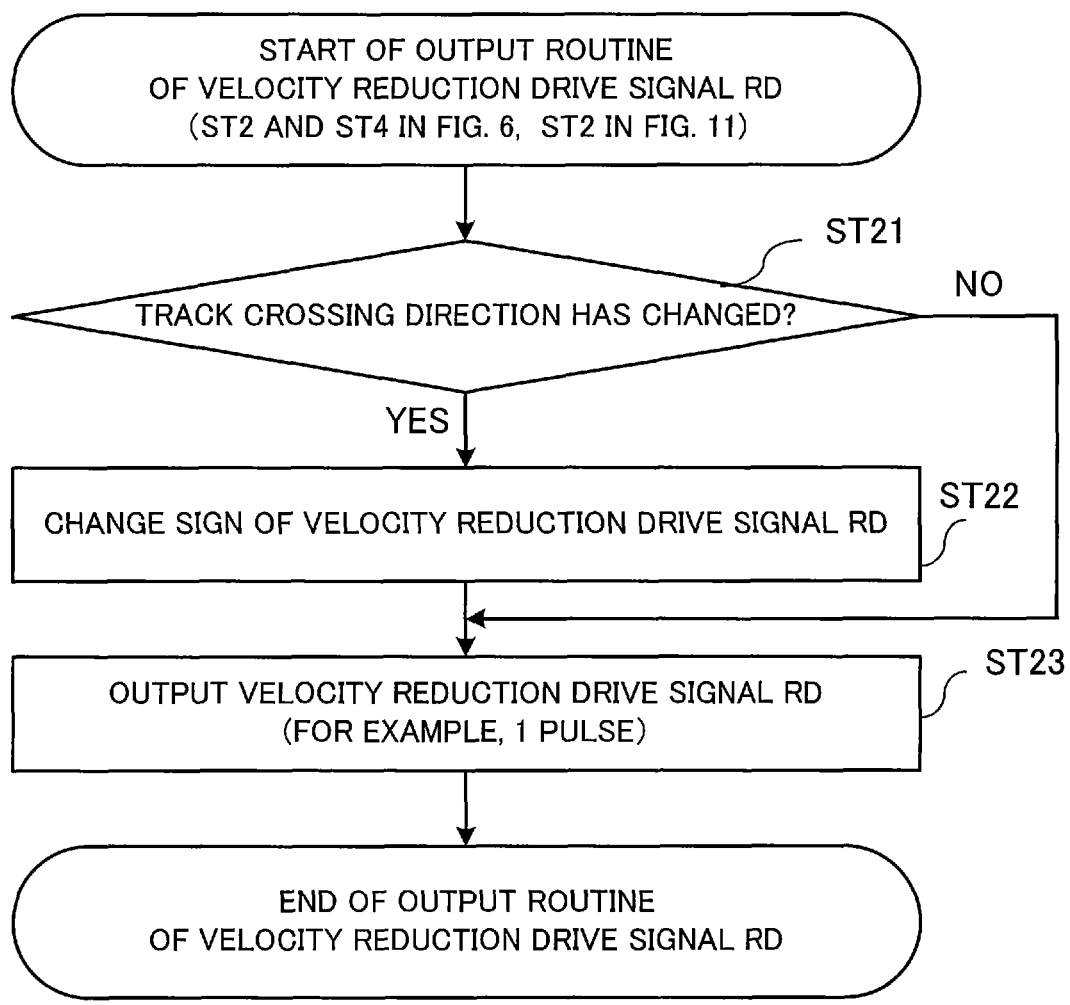
FIG. 7 is a flowchart showing an example of a velocity reduction drive signal output routine in FIG. 6 and FIG. 11.

FIG. 7 is a flowchart showing an example of the output routine of the velocity reduction drive signal RD in the tracking control devices 80 according to the embodiments 1 and 2. FIG. 7 shows details of the output routine of the velocity reduction drive signal RD in the steps ST2 and ST4 in FIG. 6.

As shown in FIG. 7, when the output routine of the velocity reduction drive signal RD is started, the system controller 60 determines whether or not the track crossing direction has switched over (step ST21). The track crossing direction is determined by the track crossing direction detector 74. The track crossing direction is indicated by a binary signal of "0" and "1", and the sign of the velocity reduction drive signal RD is changed depending on the value. For example, if the track crossing direction is indicated as "0", the sign of the velocity reduction drive signal RD is made to be positive; if the track crossing direction is indicated as "1", the sign of the velocity reduction drive signal RD is made to be negative. If the result of the determination in the step ST21 is "YES", the process proceeds to step ST22; if the result of the determination in the step ST21 is "NO", the process proceeds to step ST23.

If the result of the determination in the step 21 is "YES", the velocity-reduction drive signal generator 52 changes the sign of the velocity reduction drive signal RD (step ST22). That is, if the track crossing direction changes in a state where the velocity reduction driven signal RD is positive, the velocity reduction drive signal RD is changed to negative; if the track crossing direction changes in a state where the velocity reduction driven signal RD is negative, the velocity reduction drive signal RD is changed to positive. Here, when the sign is changed, the absolute values are made to be equal.

If the result of the determination in the step ST21 is "NO", the velocity-reduction drive signal generator 52 outputs the velocity reduction drive signal RD without changing the sign of the velocity reduction drive signal RD (step ST23). Thus the output routine of the velocity reduction drive signal RD terminates.

<1-4> Effects of Embodiment 1

As described above, according to the tracking control device 80 and the tracking control method according to the embodiment 1, after a shift from the tracking-off state where no tracking control is performed (the state where the loop switch 53 selects the contact point 53A) to the state of tracking control based on the velocity reduction drive signal RD (the state where the loop switch 53 selects the contact point 53C), the tracking pull-in is executed and it shifts to the state of tracking control based on the tracking error signal TE (the state where the loop switch 53 selects the contact point 53B), and thus the lens offset amount LO2 in the period of the tracking control after the tracking pull-in can be suppressed. Therefore, it is possible to prevent the objective lens 24 from moving beyond the allowable movable range, and stable tracking control can be achieved.

<2> Embodiment 2

<2-1> Configuration of Embodiment 2

In the embodiment 1, the method of setting a voltage value of the velocity reduction drive signal RD so that a period during which the objective lens actuator 26 is driven on the basis of the velocity reduction drive signal RD (i.e., an output time of the velocity reduction drive signal RD) is larger than ¼ times a reciprocal of the natural vibration frequency of the objective lens actuator 26 and so that the objective lens 24 does not move beyond the allowable movable range in the tracking direction during output of the velocity reduction drive signal RD has been explained. However, if vibration occurs due to external factors during the output of the velocity reduction drive signal RD, the vibration's influence over the objective lens 24 is worrying. In particular, if the frequency of the external vibration is equal to the natural vibration frequency of the objective lens actuator 26, the wobble amount of the objective lens 24 increases due to the vibration, and there is a possibility that the objective lens 24 moves beyond the allowable movable range in the tracking direction during the output of the velocity reduction drive signal RD. Accordingly, in embodiment 2, a method of making an output time of the velocity reduction drive signal RD less than ¼ times a reciprocal of the natural vibration frequency of the objective lens actuator 26 will be described.

Figure 8:
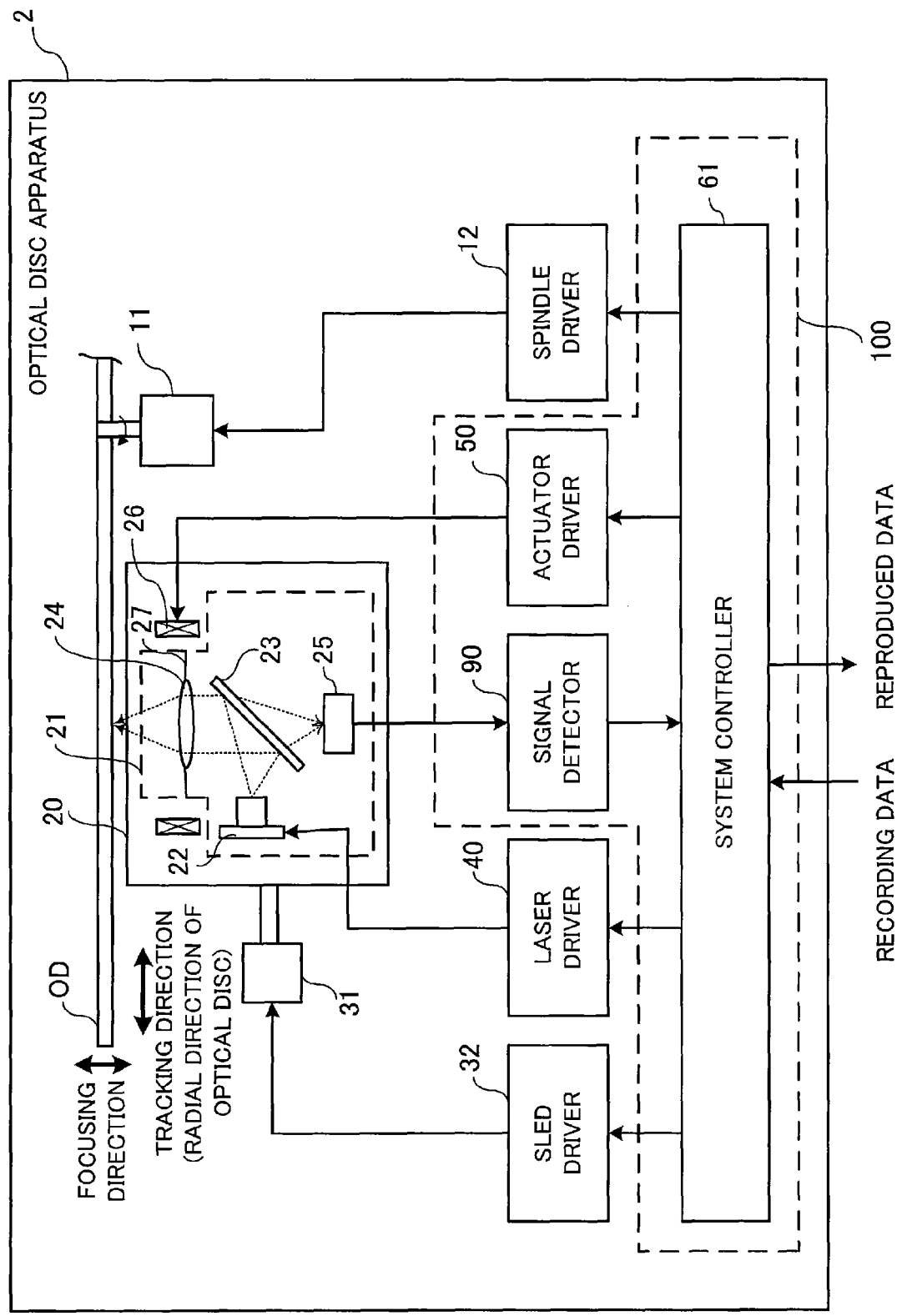
FIG. 8 is a block diagram schematically showing a configuration of an optical disc apparatus including a tracking control device according to embodiment 2 of the present invention.

FIG. 8 is a block diagram schematically showing a configuration of an optical disc apparatus 2 including a tracking control device 100 according to the embodiment 2 of the present invention. In FIG. 8, elements that are the same as or correspond to the elements shown in FIG. 1 (embodiment 1) are denoted by the same reference numerals. The optical disc apparatus 2 according to the embodiment 2 differs from the optical disc apparatus 1 according to the embodiment 1 in respect of the configuration of the tracking control device 100. Specifically, as shown in FIG. 8, a configuration of a signal detector 90 and control contents of a system controller 61 in the embodiment 2 differ from the configuration of the signal detector 70 and the control contents of the system controller 60 in the embodiment 1.

Figure 9:
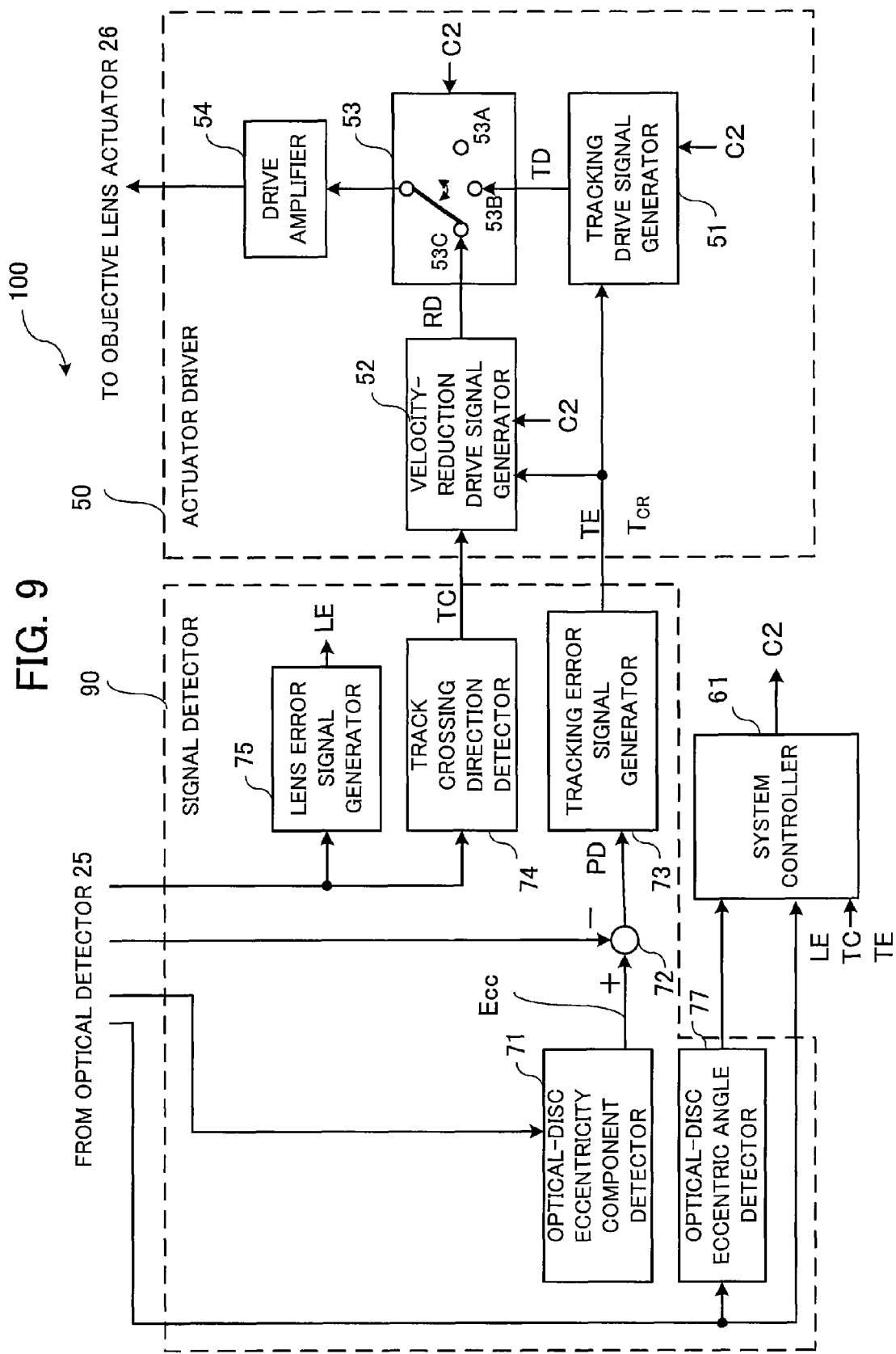
FIG. 9 is a block diagram schematically showing a configuration of the tracking control device according to embodiment 2 (that is, a device capable of carrying out a tracking control method according to the embodiment 2).

FIG. 9 is a block diagram schematically showing a configuration of the tracking control device 100 according to the embodiment 2 (that is, a device capable of carrying out a tracking control method according to the embodiment 2). In FIG. 9, elements that are the same as or correspond to the elements shown in FIG. 2 (embodiment 1) are denoted by the same reference numerals. The tracking control device 100 according to the embodiment 2 differs from the tracking control device 80 according to the embodiment 1 in respect that the signal detector 90 includes an optical-disc eccentric angle detector 77 and in respect of control contents of the system controller 61. The optical-disc eccentric angle detector 77 detects an optical-disc eccentric angle on the basis of a rotational angle of the spindle motor 11.

<2-2> Operation of Embodiment 2

Figure 10:
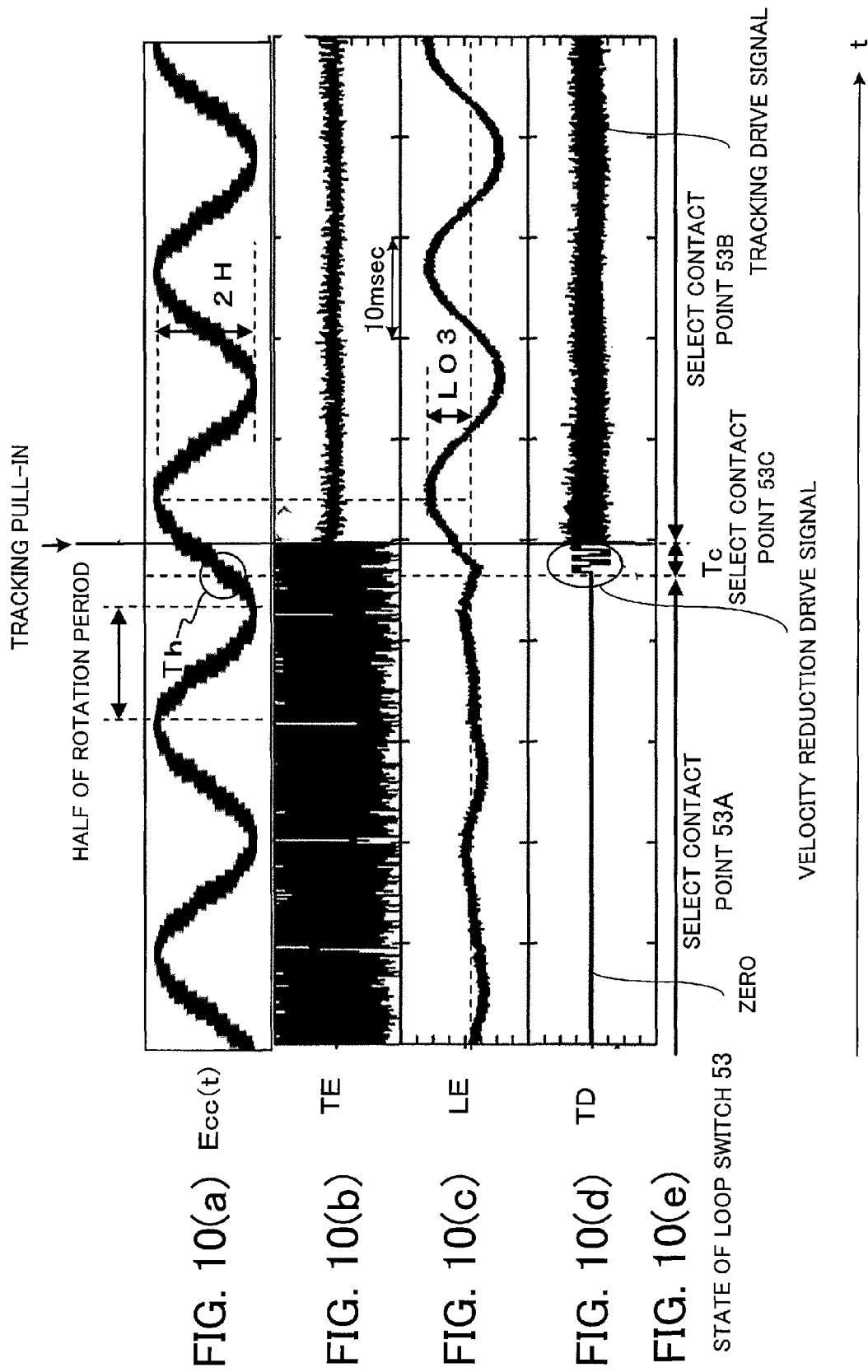
FIGS. 10(a) to 10(e) are diagrams showing an example of signal waveforms in a case where tracking pull-in is executed in the tracking control device according to the embodiment 2.

FIGS. 10(*a*) to 10(*e*) are diagrams showing an example of signal waveforms in a case where tracking pull-in is executed in the tracking control device 100 according to the embodi-ment 2, and show the optical-disc eccentricity component Ecc(t) (FIG. 10(*a*)), the tracking error signal TE (FIG. 10(*b*)), the lens error signal LE (FIG. 10(*c*)), the tracking drive signal TD (FIG. 10(*d*)), and a state of the loop switch 53 (FIG. 10(*e*)). In the case of FIGS. 10(*a*) to 10(*e*), like in the case of FIGS. 4(*a*) to 4(*e*), the loop switch 53 is switched from the state of the contact point 53A via the state of the contact point 53C to the state of the contact point 53B. That is, it is switched from the tracking-off state to the state where driving based on the velocity reduction drive signal RD is performed, and the tracking pull-in is then executed.

The output time of the velocity reduction drive signal RD in FIGS. 10(*a*) to 10(*e*) differs from that in FIGS. 4(*a*) to 4(*e*). In the case of FIGS. 10(*a*) to 10(*e*), the output time ($T_C$) of the velocity reduction drive signal RD is approximately 0.003 (sec). Meanwhile, ¼ times a reciprocal ($T_{FO}$ (sec)) of the natural vibration frequency of the objective lens actuator 26 is approximately 0.004 (sec). From this fact, a relationship of the following expression (7) is established between $T_C$ and $T_{FO}/4$.

$$T_C < T_{FO}/4 \qquad \text{Expression (7)}$$

If the relationship of the expression (7) is established, during the output of the velocity reduction drive signal RD, a possibility that the objective lens 24 moves beyond the allowable movable range in the tracking direction is reduced. Thus, there is no problem even if the voltage value of the velocity reduction drive signal RD is made larger than that in the case of FIG. 4, and the voltage value may be any large value so long as the objective lens 24 does not move beyond the allowable movable range in the tracking direction during the output of the velocity reduction drive signal RD.

In the case of FIGS. 10(*a*) to 10(*e*), a start timing of output of the velocity reduction drive signal RD, that is, a timing of switching the loop switch 53 from the state where the contact point 53A is selected to the state where the contact point 53C is selected, is important. It is assumed that the objective lens 24 is at rest in the neutral position in the tracking-off state. Meanwhile, for example, if the velocity reduction drive signal RD is output at a timing when the optical-disc eccentric angle is 90 degrees or 270 degrees, since it is a time when the optical-disc eccentricity component Ecc(t) becomes a maximum or a minimum, so that the position of the objective lens 24 is most distant from the position of the optical-disc eccentricity component Ecc(t). In this case, it takes a time for the objective lens 24 to catch up with the eccentricity of the optical disc OD, and if the output time of the velocity reduction drive signal RD is 0.003 (sec) as in FIGS. 10(*a*) to 10(*e*), it is difficult for the objective lens 24 to catch up with the eccentricity of the optical disc OD. If the tracking pull-in is executed under this condition, there is a possibility that a lens offset amount becomes large after the tracking pull-in.

Therefore, the velocity reduction drive signal RD is output at a timing when the optical-disc eccentricity component Ecc(t) is a vicinity of zero, that is, at a timing when the optical-disc eccentric angle is a vicinity of 0 degrees or a vicinity of 180 degrees. In the case of FIGS. 10(*a*) to 10(*e*), a start timing Th of output of the velocity reduction drive signal RD is when the optical-disc eccentric angle is a vicinity of 0 degrees. In this case, immediately after the velocity reduction drive signal RD is output, it is possible for the objective lens 24 to catch up with the eccentricity of the optical disc OD. Thus a lens offset amount LO3 after the tracking pull-in can be suppressed.

In the aforementioned case, a movement amount of the objective lens 24 after the tracking pull-in is about H (m). As shown in FIG. 10(*c*), the maximum voltage LO3 (V) of the lens error signal LE can be expressed by the following expression (8), where lens error detection sensitivity is LK (V/m).

$$LO3 \approx H \cdot LK \qquad \text{Expression (8)}$$

In comparison between the expressions (4) and (8), in the case where the tracking pull-in is executed in the embodiment 2, the lens offset amount LO3 after the tracking pull-in is half in comparison with that in the case where the tracking pull-in is executed by using the technique disclosed in the Patent Reference 1. Thus tracking control after the tracking pull-in is stabilized.

Figure 11:
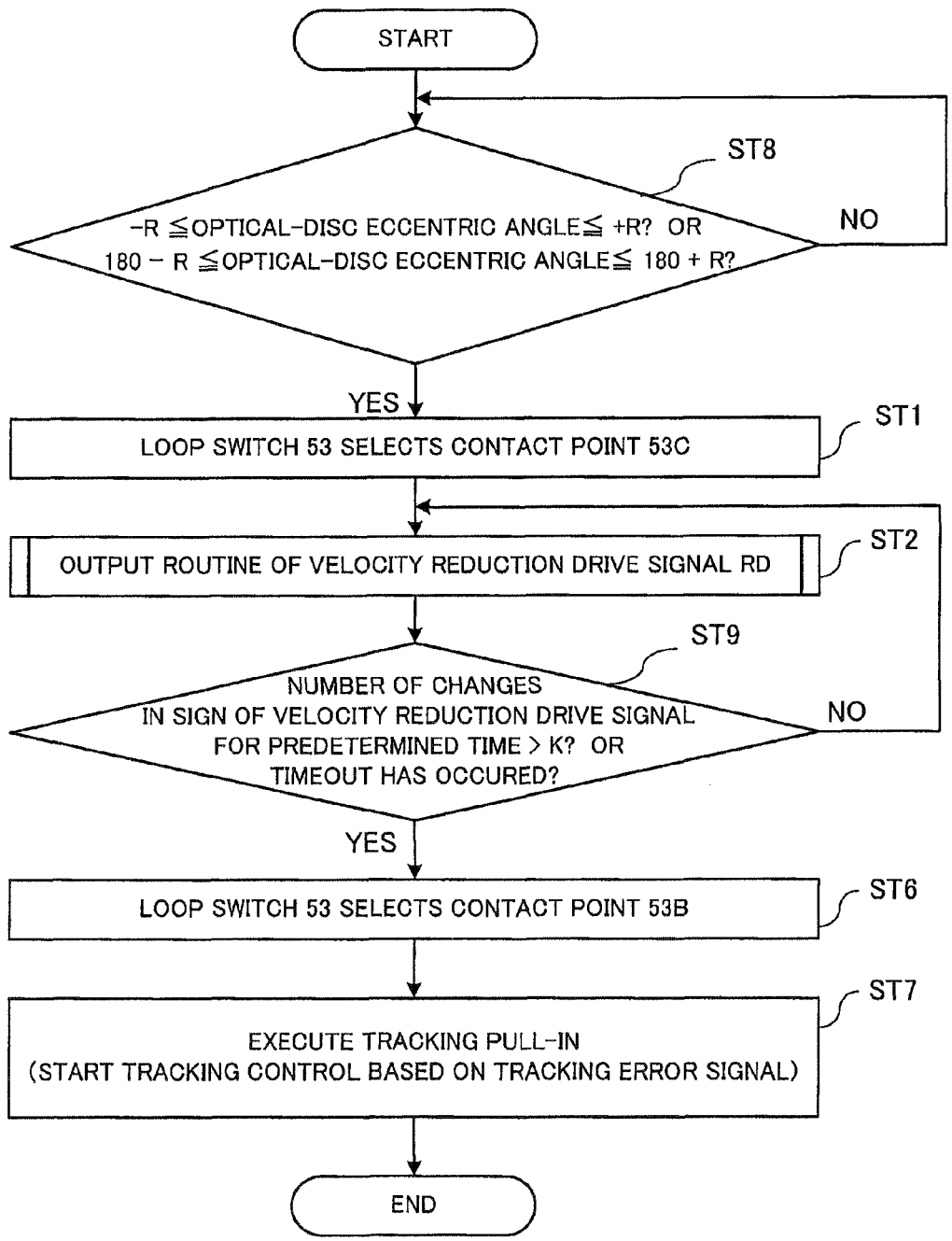
FIG. 11 is a flowchart showing an example of operation of the tracking control device according to the embodiment 2 (that is, the tracking control method according to the embodiment 2).

FIG. 11 is a flowchart showing an example of the operation of the tracking control device 100 according to the embodiment 2 (that is, the tracking control method according to the embodiment 2). Steps ST1, ST2, ST6 and ST7 in FIG. 11 are the same as the corresponding steps in the flowchart showing an example of the tracking control method shown in FIG. 6.

When tracking control is started, the system controller 61 determines whether the optical-disc eccentric angle lies within a range between ±R (R (degrees) is a predetermined value), or whether or not it lies within a range between 180−R and 180+R (step ST8). The optical-disc eccentric angle can be acquired at the optical-disc eccentric angle detector 77. As shown in FIG. 10, it is desirable that the start timing of output of the velocity reduction drive signal RD be when the optical-disc eccentric angle is a vicinity of 0 degrees or a vicinity of 180 degrees. If the result of the determination in the step ST8 is "YES", the process proceeds to the step ST1; if the result of the determination in the step ST8 is "NO", the determination is performed in the step ST8 again.

If the result of the determination in the step ST8 is "YES", the loop switch 53 switches from the state where the switch selects the contact point 53A to the state where it selects the contact point 53C (step ST1).

Next, the velocity-reduction drive signal generator 52 outputs the velocity reduction drive signal RD to the objective lens actuator 26 (step ST2). Details of output processing of the velocity reduction drive signal RD are similar to those in the flowchart of FIG. 7.

Then, the system controller 61 determines whether the number of changes in the sign of the velocity reduction drive signal RD in a predetermined time exceeds a predetermined value K or whether or not a timeout has occurred (step ST9). The timeout time is set to be smaller than $T_{FO}/4$, that is, smaller than a value of ¼ times a reciprocal of the natural vibration frequency of the objective lens actuator 26.

Next, the loop switch 53 switches from the state where the switch selects the contact point 53C to the state where it selects the contact point 53B (step ST6). Next, the tracking pull-in is started by the system controller 61 (step ST7). If the tracking pull-in of the step ST7 is started, tracking control is terminated by the system controller 61.

The flowchart of FIG. 11 also differs from the flowchart of FIG. 6 in that the step of measuring the track crossing period TCR and determining whether or not the track crossing period TCR exceeds a certain value (the step ST5 in FIG. 6) is absent. This is because it is intended to execute the tracking pull-in within the timeout time determined in the step ST8 in FIG. 11 after the velocity reduction drive signal RD is output. If external vibration occurs during output of the velocity reduction drive signal RD, influence caused by the vibration is suppressed by executing the tracking pull-in at an early stage. The step ST4 is, on the contrary, processing of waiting until the track crossing period $T_{CR}$ exceeds a certain value, and so the influence caused by the vibration occurs during that time.

If TR is set at a value close to zero in the step ST4 in the flowchart of FIG. 6, however, it becomes possible to introduce the step ST4 into the flowchart of FIG. 11.

<2-3> Effects of Embodiment 2

As described above, according to the tracking control device 100, tracking control method and optical disc apparatus 2 according to the embodiment 2, after a shift from the tracking-off state where no tracking control is performed (the state where the loop switch 53 selects the contact point 53A) to the state of tracking control based on the velocity reduction drive signal RD (the state where the loop switch 53 selects the contact point 53C), the tracking pull-in is executed and then a shift to the state of tracking control based on the tracking error signal TE (the state where the loop switch 53 selects the contact point 53B) is caused. Therefore, the lens offset amount LO3 in a period of the tracking control after the tracking pull-in can be suppressed. This makes it possible to prevent the objective lens 24 from moving in the tracking direction beyond the allowable movable range, and thus stable tracking control can be achieved.

Moreover, according to the tracking control device 100, tracking control method and optical disc apparatus 2 according to the embodiment 2, a timing of shift (i.e., a start timing of output of the velocity reduction drive signal RD) from the tracking-off state (the state where the loop switch 53 selects the contact point 53A) to the state of tracking control based on the velocity reduction drive signal RD (the state where the loop switch 53 selects the contact point 53C) is set to be a timing when the optical-disc eccentric angle is a vicinity of 0 degrees or a vicinity of 180 degrees, and a period (i.e., an output time of the velocity reduction drive signal RD) of the state of tracking control based on the velocity reduction drive signal. RD (the state where the loop switch 53 selects the contact point 53C) is set to be smaller than ¼ times a reciprocal of the natural vibration frequency of the objective lens actuator 26. Therefore, the lens offset amount LO3 after the tracking pull-in can be suppressed and influence caused by external vibration or the like can be suppressed. This makes it possible to prevent the objective lens 24 from moving beyond the allowable movable range even if external vibration occurs, for example, and thus stable tracking control can be achieved.

<3> Variations

The tracking control devices 80 and 100 and tracking control methods according to the embodiments 1 and 2 described above may be achieved by means of only hardware resources such as electronic circuits, or may be achieved by means of cooperation of hardware resources and software. If being achieved by means of cooperation of hardware resources and software, the tracking control devices 80 and 100 and tracking control methods are achieved, for example, by executing a computer program by a computer, more specifically, by reading out a computer program recorded in a recording medium such as a ROM (Read Only Memory) to a main memory device and by executing the computer program by a central processing unit (CPU). The computer program may be provided from a computer-readable recording medium such as an optical disc in which the computer program is recorded, or may be provided via a communication line such as the Internet.

In addition, the present invention is not restricted to the embodiments described above and can be employed in various embodiments without departing from the scope of the present invention.

DESCRIPTION OF REFERENCE CHARACTERS 1, 2 optical disc apparatus; 11 spindle motor; 12 spindle driver; 20 optical pickup; 21 lens unit; 22 laser light source;

23 beam splitter; 24 objective lens; 25 optical detector; 26 objective lens actuator; 27 elastic support member; 31 sled motor; 32 sled driver; 40 laser driver; 50 actuator driver; 51 tracking drive signal generator; 52 velocity-reduction drive signal generator; 53 loop switch (drive signal switch); 53A, 53B, 53C contact point; 54 drive amplifier; 60, 61 system controller; 70, 90 signal detector; 71 optical-disc eccentricity component detector; 72 subtractor; 73 tracking error signal generator; 74 track crossing direction detector; 75 lens error signal generator; 77 optical-disc eccentric angle detector; 80, 100 tracking control device; OD optical disc; C1, C2 control signal; Ecc optical-disc eccentricity component; LE lens error signal; RD velocity reduction drive signal; TC track crossing direction signal; TD tracking drive signal; TE tracking error signal.

What is claimed is:

1. A tracking control device comprising:
a signal detector to detect, from a detection signal of an optical detector that receives light reflected from a track of a rotating optical disc, a tracking error signal, and a crossing direction, a crossing period and a crossing velocity of an objective lens with respect to the track;
a first drive signal generator to generate, on a basis of the tracking error signal detected by the signal detector, a first tracking drive signal for driving an objective lens actuator that moves the objective lens of an optical pickup in a tracking direction;
a second drive signal generator to generate, on a basis of the crossing direction and the crossing period detected by the signal detector, a second tracking drive signal for converging the crossing velocity into a vicinity of zero;
a drive signal switch to switch a drive signal supplied to the objective lens actuator; and
a system controller to control operation of the first drive signal generator, the second drive signal generator and the drive signal switch so as to cause to execute second driving for driving the objective lens actuator on a basis of the second tracking drive signal and switch from the second driving to first driving for driving the objective lens actuator on a basis of the first tracking drive signal, thereby causing to execute the first driving; wherein:
the signal detector includes an optical-disc eccentric angle detector to detect an optical-disc eccentric angle of the rotating optical disc, and
the system controller causes to start the second driving of the objective lens actuator based on the second tracking drive signal at a timing when the optical-disc eccentric angle is substantially 0 degrees or 180 degrees.

2. The tracking control device according to claim 1, wherein the generation of the second tracking drive signal by the second drive signal generator is executed by controlling a voltage of the second tracking drive signal so as to prevent the objective lens from moving beyond the predetermined allowable movable range in the tracking direction during the second driving.

3. The tracking control device according to claim 1, wherein an output time in the second driving, during which the second tracking drive signal is output, is smaller than ¼ times a reciprocal of a natural vibration frequency of the objective lens actuator.

4. A tracking control method comprising:
detecting, from a detection signal of an optical detector that receives light reflected from a track of a rotating optical disc, a tracking error signal, and a crossing direction, a crossing period and a crossing velocity of an objective lens with respect to the track;
detecting an optical-disc eccentric angle of the rotating optical disc;
generating a first tracking drive signal, on a basis of the detected tracking error signal, for driving an objective lens actuator that moves the objective lens of an optical pickup in a tracking direction;
generating a second tracking drive signal, on a basis of the detected crossing direction and crossing period, for converging the crossing velocity into a vicinity of zero; and
switching a drive signal supplied to the objective lens actuator so as to cause to execute second driving for driving the objective lens actuator on a basis of the second tracking drive signal and switch from the second driving to first driving for driving the objective lens actuator on a basis of the first tracking drive signal, thereby causing to execute the first driving;
wherein the second driving of the objective lens actuator based on the second tracking drive signal is started at a timing when the optical-disc eccentric angle is substantially 0 degrees or 180 degrees.

5. The tracking control method according to claim 4, wherein the generation of the second tracking drive signal in the generating the second tracking drive signal is executed by controlling a voltage of the second tracking drive signal so as to prevent the objective lens from moving beyond the predetermined allowable movable range in the tracking direction during the second driving.

6. The tracking control method according to claim 4, wherein an output time in the second driving, during which the second tracking drive signal is output, is smaller than ¼ times a reciprocal of a natural vibration frequency of the objective lens actuator.

7. An optical disc apparatus comprising:
a spindle motor to rotate an optical disc;
a laser light source to irradiate a track of the rotating optical disc with laser light;
an objective lens to condense the laser light and light reflected from the track;
an objective lens actuator to move the objective lens at least in a tracking direction;
an optical detector to receive the light reflected from the track;
a signal detector to detect, from a detection signal of the optical detector, a tracking error signal, and a crossing direction, a crossing period, and a crossing velocity of the objective lens with respect to the track;
a first drive signal generator to generate a first tracking drive signal for driving the objective lens actuator that moves the objective lens of an optical pickup in the tracking direction on a basis of the tracking error signal detected by the signal detector;
a second drive signal generator to generate a second tracking drive signal for converging the crossing velocity into a vicinity of zero on a basis of the crossing direction and the crossing period detected by the signal detector;
a drive signal switch to switch a drive signal supplied to the objective lens actuator; and
a system controller to control operation of the first drive signal generator, the second drive signal generator and the drive signal switch so as to cause to execute second driving for driving the objective lens actuator on a basis of the second tracking drive signal and switch from the second driving to first driving for driving the objective lens actuator on a basis of the first tracking drive signal, thereby causing to execute the first driving; wherein:

the signal detector includes an optical-disc eccentric angle detector to detect an optical-disc eccentric angle of the rotating optical disc, and the system controller causes to start the second driving of the objective lens actuator based on the second tracking drive signal at a timing when the optical-disc eccentric angle is substantially 0 degrees or 180 degrees.

\* \* \* \* \*